(12) United States Patent
Su et al.

(10) Patent No.: US 12,091,556 B2
(45) Date of Patent: *Sep. 17, 2024

(54) STIR-IN TITANIUM DIOXIDE PIGMENT COMPOSITION

(71) Applicant: Tronox LLC, Oklahoma City, OK (US)

(72) Inventors: Quan Su, Edmond, OK (US); Venkata Rama Rao Goparaju, Edmond, OK (US)

(73) Assignee: Tronox LLC, Oklahoma City, OK (US)

(*) Notice: Subject to any disclaimer, the term of this patent is extended or adjusted under 35 U.S.C. 154(b) by 262 days.

This patent is subject to a terminal disclaimer.

(21) Appl. No.: 15/897,126

(22) Filed: Feb. 14, 2018

(65) Prior Publication Data

US 2019/0249014 A1  Aug. 15, 2019

(51) Int. Cl.
- C09C 1/36 (2006.01)
- C09D 7/62 (2018.01)
- C09D 17/00 (2006.01)
- C08K 3/22 (2006.01)

(52) U.S. Cl.
CPC ............. C09C 1/3661 (2013.01); C09D 7/62 (2018.01); C09D 17/008 (2013.01); *C01P 2006/22* (2013.01); *C08K 2003/2241* (2013.01); *C09C 1/3623* (2013.01)

(58) Field of Classification Search
CPC ....... C09C 1/3623; C09C 1/3661; C09D 7/62; C09D 17/008; C01P 2006/22; C08K 2003/2241

See application file for complete search history.

(56) References Cited

U.S. PATENT DOCUMENTS

| | | |
|---|---|---|
| 3,345,187 A | 10/1967 | Binnis |
| 3,649,323 A | 3/1972 | Roe et al. |
| 3,847,640 A | 11/1974 | Daubenspeck et al. |
| 3,884,871 A | 5/1975 | Herman et al. |
| 4,052,223 A | 10/1977 | Howard |
| 4,280,849 A | 7/1981 | Howard et al. |
| 4,375,989 A | 3/1983 | Makinen |
| 4,978,396 A | 12/1990 | Story |
| 5,952,404 A | 9/1999 | Simpson et al. |
| 6,287,377 B1 | 9/2001 | Binns et al. |
| 6,342,099 B1 | 1/2002 | Hiew et al. |
| 6,569,920 B1 | 5/2003 | Wen et al. |
| 6,695,906 B2 | 2/2004 | Hiew et al. |
| 7,318,864 B2 | 1/2008 | Reisacher et al. |
| 7,459,017 B2 | 12/2008 | Ortalano et al. |
| 7,833,343 B2 | 11/2010 | Plueg et al. |
| 7,842,757 B2 | 11/2010 | Roy et al. |
| 8,118,924 B2 | 2/2012 | Sujeeth et al. |
| 8,318,848 B2* | 11/2012 | Finegan ............ C08K 3/22 524/547 |
| 8,562,124 B2 | 10/2013 | Anton et al. |
| 8,796,366 B2 | 8/2014 | Beck et al. |
| 10,316,209 B2 | 6/2019 | Vanhecke et al. |
| 2001/0007231 A1 | 7/2001 | Kostelnik et al. |
| 2003/0108667 A1 | 6/2003 | McIntyre et al. |
| 2005/0016419 A1 | 1/2005 | Bettler et al. |
| 2005/0139126 A1 | 6/2005 | Khan |
| 2006/0027141 A1 | 2/2006 | Tarng |
| 2006/0107873 A1* | 5/2006 | El-Shoubary .......... C09C 3/006 106/499 |
| 2011/0288209 A1 | 11/2011 | Beck et al. |
| 2013/0019578 A1 | 8/2013 | Willis et al. |
| 2014/0158931 A1 | 6/2014 | Poncelet et al. |
| 2014/0235776 A1 | 8/2014 | Peera et al. |
| 2014/0275442 A1 | 9/2014 | Goparaju et al. |
| 2015/0292160 A1 | 10/2015 | Vanhecke et al. |
| 2015/0299492 A1 | 10/2015 | Hinkley et al. |
| 2015/0337138 A1 | 11/2015 | Vanhecke et al. |
| 2016/0122472 A1* | 5/2016 | Su ...................... C09C 1/3692 524/612 |
| 2016/0021357 A1 | 7/2016 | Schlossman et al. |

FOREIGN PATENT DOCUMENTS

| | | |
|---|---|---|
| CA | 2362443 A1 | 9/2000 |
| CN | 1047102 A | 5/1995 |
| CN | 1305440 A | 7/2001 |
| CN | 101065453 B | 5/2012 |
| CN | 105164053 A | 12/2015 |
| CN | 105566609 A | 5/2016 |
| DE | 19943668 A1 | 3/2001 |
| DE | 69519418 T2 | 4/2001 |
| EP | 0009296 B1 | 11/1982 |
| EP | 0721966 B1 | 11/2000 |
| EP | 3260502 A1 | 6/2016 |
| JP | S5020570 A | 3/1975 |
| JP | H0124732 A | 5/1989 |
| JP | H04505172 A | 9/1992 |
| JP | 2008521970 A | 6/2008 |
| WO | 9013606 | 11/1990 |
| WO | 0053679 A1 | 9/2000 |
| WO | 200657993 A1 | 6/2006 |
| WO | 2010080426 A1 | 7/2010 |

OTHER PUBLICATIONS

English translation of Office Action issued Nov. 27, 2018 in corresponding Taiwan applicaiton No. 107108953, Tronox LLC.
International Search Report and Written Opinion issued May 31, 2018 in corresponding international application PCT/US18/25659, Tronox LLC.
Office Action issued in related Taiwanese Patent Application No. 107108953 dated Feb. 11, 2020.

(Continued)

*Primary Examiner* — James A Fiorito
*Assistant Examiner* — Ross J Christie
(74) *Attorney, Agent, or Firm* — McAfee & Taft

(57) ABSTRACT

A titanium dioxide pigment composition for use in a waterborne latex paint formulation is provided. The pigment composition comprises a plurality of titanium dioxide particles, and a dispersant package deposited on the surfaces of said titanium dioxide particles in an amount of no greater than about 5% by weight based on the combined weight of the titanium dioxide particles and the dispersant package. A titanium dioxide pigment composition slurry, a method of forming a titanium dioxide pigment composition, and a method of forming a titanium dioxide pigment composition slurry, all for use in a waterborne latex paint formulation, are also provided.

26 Claims, No Drawings

(56) References Cited

OTHER PUBLICATIONS

Supplementary Search Report issued in European Patent No. 18906119.5, dated Oct. 12, 2021.
Examiner's Requisition issued in Canadian Patent Application No. 3091287, dated Nov. 15, 2021.
Search Report issued in Taiwanese Patent Application No. 107108953 dated Mar. 12, 2021.
Office Action Issued in corresponding Japanese patent application No. 2020-543198, dated Mar. 9, 2022.
Office Action issued in corresponding Japanese Patent Application No. 2020-543198, dated Feb. 15, 2022.
Search Report issued in corresponding Brazilian Patent Application No. BR112020016550-6, dated Jul. 19, 2022.
Substantive Examination Report issued in Malaysian Patent Application No. PI2020004100, dated Jun. 28, 2022.
International Search Report and Written Opinion mailed in corresponding PCT Application No. PCT/US18/25659, dated Mar. 31, 2018.
Examination Report issued in corresponding Indian Application No. 202017034767, dated Jan. 12, 2021.
Office Action mailed in corresponding Japanese Application No. 2020-543198, dated Mar. 9, 2022.
Office Action mailed in corresponding Chinese Application No. 2018800911275, dated May 6, 2021.
Office Action issued in related Brazilian Patent Application No. BR1120200165506; Date: Jan. 4, 2023.
Examination Report issued in related Canadian Patent Application No. 3091287; Date: Sep. 25, 2023.
Examination Report issued in related Australian Patent Application No. 2018408822; Date: Nov. 22, 2023.
Evonik Operations GmbH, "Surfynol 104 E", Data Sheet, p. 1.
Ziebold, S. et al., "Farbe und Lack", Mar. 2017, pp. 1-8.
Winkler, Jochen, "Dispergieren von Pigmenten und Fullstoffen", Farbe und Lack Edition, Vincentz Network, 2010, pp. 1-12.
Dorr, H. et al., "KRONOS Titandioxid in Dispersionsfarben", Kronos-Titan GmbH, 1989, pp. 1-20.
Notice of Opposition issued in corresponding European Patent Application No. 18906119.5 dated Nov. 8, 2023.
Evonik Operations GmbH, "Surfynol 104 E", Data Sheet, p. 1-2.
Ziebold, S. et al., "Farbe und Lack", Mar. 2017, pp. 1-16.
Winkler, Jochen, "Dispergieren von Pigmenten und Fullstoffen", Farbe und Lack Edition, Vincentz Network, 2010, pp. 1-24.
Dorr, H. et al., "KRONOS Titandioxid in Dispersionsfarben", Kronos-Titan GmbH, 1989, pp. 1-40.

* cited by examiner

STIR-IN TITANIUM DIOXIDE PIGMENT COMPOSITION

BACKGROUND

Titanium dioxide is an effective inorganic pigment for use as a white opacifying agent in aqueous based latex paints. Titanium dioxide can be formed by either the sulfate process or the chloride process.

Whether produced by the sulfate process or the chloride process, the produced titanium dioxide particles are typically coated with one or more inorganic materials to modify or enhance the properties and characteristics of the pigment for the particular application. For example, the pigment particles are often coated with compounds that function to improve the opacity, light stability and durability of the pigment. Examples of inorganic materials used to coat titanium dioxide pigments include alumina and silica.

A primary property that a titanium dioxide pigment contributes to a latex paint formulation is hiding power. The hiding power of a titanium dioxide pigment in a latex paint formulation is based on the ability of the pigment to scatter light in the paint formulation. The ability of the pigment to scatter light in the paint formulation (the light scattering efficiency of the pigment) depends on various factors, including the particle size of the pigment, the difference in refractive index of the pigment particles and their surroundings, and the proximity of the pigment particles to one another. For example, a large difference in the refractive index of the pigment particles and the paint formulation results in a high scattering efficiency.

A titanium dioxide pigment is added to an aqueous-based latex paint formulation during the paint formulation manufacturing process. Unfortunately, this is a difficult process that requires high energy equipment and dispersants. Before the titanium dioxide pigment can be added to the paint formulation, it generally must be ground and dispersed into water to form an aqueous pigment slurry. The grinding process breaks down agglomerates of the pigment so that the pigment can be more easily dispersed into the water to form the slurry. Dispersants and surfactants are typically added to the slurry to wet the pigment surface and stabilize the particles after they are separated. The slurry can then be added to the paint formulation.

The grinding process is labor intensive, requires high speed grinding equipment and consumes a great deal of energy. Furthermore, the need to first grind the titanium dioxide pigment and disperse it in water also complicates the overall paint manufacturing process. For example, after a batch of the latex paint formulation is initially produced, the hiding power and tint strength of the formulation may be low, meaning that the batch is off-spec. As a result, it may be necessary to add more titanium dioxide pigment to the batch in order to boost its hiding power and tint strength. However, in order to do this, the titanium dioxide must first be ground and dispersed in water to form a pigment slurry. This requires extra time and labor, and slows down the overall production process. The additional slurry also adds more water to the paint formulation which can be problematic in and of itself.

SUMMARY

In one aspect, a titanium dioxide pigment composition for use in a waterborne latex paint formulation is provided. The pigment composition comprises a plurality of titanium dioxide particles, and a dispersant package deposited on the surfaces of the titanium dioxide particles in an amount of no greater than about 5% by weight based on the combined weight of the titanium dioxide particles and the dispersant package. The dispersant package includes at least one non-volatile neutralizing agent selected from the group of organic compounds having at least one amine functional group and at least one hydroxy functional group, inorganic alkali salts, and combinations thereof, at least one dispersant component selected from the group of low molecular weight monomeric dispersants, polymeric dispersants and combinations thereof, and at least one polyhydric alcohol component.

In another aspect, a titanium dioxide pigment composition slurry for use in a waterborne latex paint formulation is provided. The pigment composition comprises an aqueous medium, a plurality of titanium dioxide particles dispersed in the aqueous medium, and a dispersant package deposited on the surfaces of the titanium dioxide particles in an amount of no greater than about 5% by weight based on the combined weight of the titanium dioxide particles and the dispersant package. The dispersant package includes at least one non-volatile neutralizing agent selected from the group of organic compounds having at least one amine functional group and at least one hydroxy functional group, inorganic alkali salts, and combinations thereof, at least one dispersant component selected from the group of low molecular weight monomeric dispersants, polymeric dispersants and combinations thereof, and at least one polyhydric alcohol component.

In another aspect, a method of forming a titanium dioxide pigment composition for use in a waterborne latex paint formulation is provided. The method comprises providing a plurality of titanium dioxide particles and providing a dispersant package. The dispersant package includes at least one non-volatile neutralizing agent selected from the group of organic compounds having at least one amine functional group and at least one hydroxy functional group, inorganic alkali salts, and combinations thereof, at least one dispersant component selected from the group of low molecular weight monomeric dispersants, polymeric dispersants and combinations thereof, and at least one polyhydric alcohol component. The method further comprises depositing the dispersant package on the surfaces of the titanium dioxide particles in an amount of no greater than about 5% by weight based on the combined weight of the titanium dioxide particles and the dispersant package.

In another aspect, a method of forming a titanium dioxide pigment composition slurry for use in a waterborne latex paint formulation is provided. The method comprises providing an aqueous medium, providing a plurality of titanium dioxide particles and providing a dispersant package. The dispersant package includes at least one non-volatile neutralizing agent selected from the group of organic compounds having at least one amine functional group and at least one hydroxy functional group, inorganic alkali salts, and combinations thereof, at least one dispersant component selected from the group of low molecular weight monomeric dispersants, polymeric dispersants and combinations thereof, and at least one polyhydric alcohol component. The method further comprises depositing the dispersant package on the surfaces of the titanium dioxide particles in an amount of no greater than about 5% by weight based on the combined weight of the titanium dioxide particles and the dispersant package, and dispersing the titanium dioxide pigment composition in the aqueous medium.

DETAILED DESCRIPTION

The present disclosure may be understood more readily by reference to this detailed description as well as to the examples included herein. Numerous specific details are set forth in order to provide a thorough understanding of the examples described herein. However, it will be understood by those of ordinary skill in the art that the examples described herein can be practiced without these specific details. In other instances, methods, procedures and components have not been described in detail in order to avoid obscuring the related relevant feature being described. Also, the description is not to be considered as limiting the scope of the examples.

In one aspect, a titanium dioxide pigment composition for use in a waterborne latex paint formulation is provided herein. In another aspect, a titanium dioxide pigment composition slurry for use in a waterborne latex paint formulation is provided. In yet another aspect, a method of forming a titanium dioxide pigment composition for use in a waterborne latex paint formulation is provided. In yet another aspect, a method of forming a titanium dioxide pigment composition slurry for use in a waterborne latex paint formulation is provided.

As used herein and in the appended claims, a "waterborne latex paint formulation" means an aqueous based latex paint formulation.

The titanium dioxide pigment composition for use in a waterborne latex paint formulation disclosed herein comprises a plurality of titanium dioxide particles, and a dispersant package deposited on the surfaces of the titanium dioxide particles in an amount no greater than about 5% by weight based on the combined weight of the titanium dioxide particles and the dispersant package.

For example, the titanium dioxide particles can have a rutile crystalline structure or a combination of an anatase crystalline structure and a rutile crystalline structure. For example, the titanium dioxide particles can have a rutile crystalline structure. For example, the titanium dioxide can be formed by the chloride process or the sulfate process. For example, the titanium dioxide can be formed by the chloride process. For example, the titanium dioxide can be formed by the sulfate process.

In the chloride process for manufacturing titanium dioxide, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. Aluminum chloride or some other co-oxidant is typically added to the titanium halide in the oxidation reactor to facilitate rutile formation and control particle size. The titanium dioxide and gaseous reaction products are then cooled and the titanium dioxide particles are recovered.

In the sulfate process for manufacturing titanium dioxide, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

For example, the titanium dioxide particles can have at least one inorganic coating deposited on the surfaces thereof, wherein the inorganic coating(s) are selected from the group of metal oxide coatings, metal hydroxide coatings, and combinations thereof. For example, the inorganic coating(s) can be selected from the group of silica coatings, alumina coatings, aluminum phosphate coatings, zirconia coatings, titania coatings, and combinations thereof. For example, the inorganic coating(s) can be selected from the group of silica coatings, alumina coatings, zirconia coatings, and combinations thereof.

The inorganic coating(s) can be used to impart one or more properties and/or characteristics to the titanium dioxide particles to make the particles more suitable for the specific waterborne latex paint formulation to which the titanium dioxide pigment composition will be added. For example, silica and/or alumina coatings can be used to help improve the wetting and dispersing properties of the titanium dioxide pigment particles. For example, one or more inorganic coatings can be deposited on the surfaces of the titanium dioxide particles before the dispersant package is deposited on the titanium dioxide pigment particles or otherwise added to the pigment composition.

For example, the inorganic coating(s) can be deposited on the surfaces of the titanium dioxide particles in an amount in the range of about 0.5% by weight to about 15% by weight, based on the combined weight of the titanium dioxide particles and the inorganic coating(s). For example, the inorganic coating(s) can be deposited on the surfaces of the titanium dioxide particles in an amount in the range of about 1% by weight to about 10% by weight, based on the combined weight of the titanium dioxide particles and the inorganic coating(s).

As used herein and in the appended claims, "deposited on the surfaces of the titanium dioxide particles" means deposited directly or indirectly on the surfaces of the titanium dioxide particles, unless stated otherwise. For example, the dispersant package can be deposited on the surfaces of the titanium dioxide particles in an amount no greater than about 3% by weight based on the combined weight of the titanium dioxide particles and the dispersant package. For example, the dispersant package can be deposited on the surfaces of the titanium dioxide particles in an amount no greater than about 2% by weight based on the combined weight of the titanium dioxide particles and the dispersant package. For example, the dispersant package can be deposited on the surfaces of the titanium dioxide particles in an amount no greater than about 1.5% by weight based on the combined weight of the titanium dioxide particles and the dispersant package.

For example, the dispersant package can be deposited on the surfaces of the titanium dioxide particles in an amount in the range of from about 0.1% by weight to about 5% by weight based on the combined weight of the titanium dioxide particles and the dispersant package. For example, the dispersant package can be deposited on the surfaces of the titanium dioxide particles in an amount in the range of from about 0.3% by weight to about 3% by weight based on the combined weight of the titanium dioxide particles and the dispersant package. For example, the dispersant package can be deposited on the surfaces of the titanium dioxide particles in an amount in the range of from about 0.2% by weight to about 2% by weight based on the combined weight of the titanium dioxide particles and the dispersant package. For example, the dispersant package can be deposited on the surfaces of the titanium dioxide particles in an amount in the range of from about 0.5% by weight to about 1.5% by weight based on the combined weight of the titanium dioxide particles and the dispersant package.

The dispersant package includes:

a) at least one non-volatile neutralizing agent selected from the group of organic compounds having at least one amine functional group ($-NH_2R$, $-NHR_2$, or —NR3) and at least one hydroxy functional group (—OH), inorganic alkali salts, and combinations thereof;

b) at least one dispersant component selected from the group of low molecular weight monomeric dispersants, polymeric dispersants and combinations thereof; and c) at least one polyhydric alcohol component.

As used herein and in the appended claims, a "non-volatile neutralizing agent" means a neutralizing agent having a boiling point greater than or equal to 200° C. The "non-volatility" of the neutralizing agent allows the neutralizing agent to remain stable when incorporated into the titanium dioxide pigment composition disclosed herein. An "inorganic alkali salt" means an inorganic alkali salt which can be dissolved in water and used to neutralize aqueous acids.

For example, the organic compounds having at least one amine functional group and at least one hydroxy functional group used as or as part of the non-volatile neutralizing agent(s) of the dispersant package can be selected from the group of alkyl amine hydroxyls, aromatic amine hydroxyls, and combinations thereof. For example, the organic compounds having at least one amine functional group and at least one hydroxy functional group that can be used as or as part of the non-volatile neutralizing agent(s) of the dispersant package of the pigment disclosed herein can be selected from the group of 2-amino-2-methyl-1,3-propanediol, 2-amino-2-ethyl-1,3-propanediol, tris(hydroxymethyl)aminomethane, triethanolamine, N-butyl-diethanolamine, dimethylglucamine, and combinations thereof. An example of a dimethylglucamine that is suitable for use as or as part of the non-volatile neutralizing agent(s) of the dispersant package is sold by Clariant Corporation in association with the trademark Genamin® Gluco 50. For example, the organic compounds having at least one amine functional group and at least one hydroxy functional group can be 2-amino-2-methyl-1,3-propanediol.

For example, the inorganic alkali salts that can be used as or as part of the non-volatile neutralizing agent(s) of the dispersant package of the pigment disclosed herein can be selected from the group of alkali metal carbonates, alkali metal bicarbonates, and combinations thereof. Examples of alkali metal carbonates that can be used include lithium carbonate, sodium carbonate, and potassium carbonate. Examples of alkali metal bicarbonates that can be used include lithium bicarbonate, sodium bicarbonate, and potassium bicarbonate. For example, the alkali metal salts used as or as part of the non-volatile neutralizing agent(s) of the dispersant package can be an alkali metal carbonate selected from the group of lithium carbonate, sodium carbonate, potassium carbonate, and combinations thereof. For example, the alkali metal salts can be sodium carbonate.

As used herein and in the appended claims, a "low molecular weight monomeric dispersant" means a compound that includes a molecule that can be bonded to other identical molecules to form a polymer and that has a molecular weight no greater than 1000. The "molecular weight" of a compound means the number average molecular weight of the compound. A polyhydric alcohol component means an organic compound containing two or more hydroxy (—OH) groups.

For example, the low molecular weight monomeric dispersants used as or as part of the dispersant component(s) of the dispersant package can be selected from the group of phosphates, carboxylic acids, di or tri carboxylic acids, phosphonates, phosphonate based carboxylic acids, and combinations thereof. For example, the low molecular weight monomeric dispersants that can be used as or as part of the dispersant component(s) of the dispersant package of the pigment disclosed herein can be selected from the group of sodium hexametaphosphate, phosphate carboxylic acids, salts of phosphate carboxylic acids, hydroxyl carboxylic acids, salts of hydroxyl carboxylic acids, and combinations thereof. Examples of salts of hydroxyl carboxylic acids that can be used are citric acid and tartaric acid. For example, the low molecular weight monomeric dispersants can be 2-phosphonobutane-1,2,4-tricarboxylic acid. For example, the low molecular weight monomeric dispersants can be 2-phosphonobutane-1,2,4-tricarboxylic acid.

For example, the polymeric dispersants that can be used as or as part of the dispersant component(s) of the dispersant package of the pigment disclosed herein can be polymeric molecules that contain one or more functional groups of compounds selected from the group of amines, carboxylic acids, sulfonic acids, phosphonic acids, phosphoric acids, salts of amines, and combinations thereof. As used herein and in the appended claims. "polymeric molecules" includes both polymers and copolymers. For example, the polymeric dispersant used as or as part of the dispersant component(s) of the dispersant package can be selected from the group of polyacrylic acid, polyacrylic acid copolymers, salts of polyacrylic acid and polyacrylic acid copolymers, maleic acid copolymers, salts of maleic acid copolymers, and combinations thereof. For example, the polymeric dispersant can be a sulfonated styrene/maleic anhydride copolymer.

For example, the polyhydric alcohol components of the dispersant package can be selected from the group of alkyl straight chain polyols, alkyl branched chain polyols, and combinations thereof. For example, the polyhydric alcohol components that can be used as part of the dispersant package of the pigment disclosed herein are selected from the group of trimethylolpropane, ditrimethylolpropane, glycerol, diglycerol, pentaerythritol, mannitol, and combinations thereof. For example, the polyhydric alcohol components can be glycerol.

For example, the titanium dioxide pigment is in dry, powder or granule form.

For example, in one embodiment, the titanium dioxide pigment composition comprises:

a plurality of titanium dioxide particles present in the pigment composition in an amount of about 95% by weight to about 99.5% by weight, based on the combined weight of the titanium dioxide particles and the dispersant package;

a dispersant package present in the pigment composition in an amount in the range of about 0.5% by weight to about 5% by weight based on the combined weight of the titanium dioxide particles and the dispersant package, the dispersant package including:

at least one non-volatile neutralizing agent selected from the group of organic compounds having at least one amine functional group and at least one hydroxy functional group, inorganic alkali salts, and combinations thereof, the neutralizing agent being present in the pigment composition in an amount in the range of from about 0.02% by weight to about 4.86% by weight based on the combined weight of the titanium dioxide particles and the dispersant package;

at least one dispersant component selected from the group of low molecular weight monomeric dispersants, polymeric dispersants and combinations thereof, the dispersant component being present in the pigment composition in an amount in the range of from about 0.02% by weight to about 4.86% by weight based on the combined weight of the titanium dioxide particles and the dispersant package; and at least one polyhydric alcohol component, the polyhydric alcohol component being present in the pigment composition in an amount in the range of from about 0.10% by weight to about 4.86% by weight based on the combined weight of the titanium dioxide particles and the dispersant package.

For example, in another embodiment, the titanium dioxide pigment composition comprises:

a plurality of titanium dioxide particles present in the pigment composition in an amount of at least about 98% by weight, based on the combined weight of the titanium dioxide particles and the dispersant package, the titanium dioxide particles having at least one inorganic coating deposited on the surfaces thereof, wherein the inorganic coating(s) is selected from the group of metal oxide coatings, metal hydroxide coatings, and combinations thereof;

a dispersant package present in the pigment composition in an amount of no greater than about 2% by weight based on the combined weight of the titanium dioxide particles and the dispersant package, the dispersant package including:

at least one non-volatile neutralizing agent selected from the group of organic compounds having at least one amine functional group and at least one hydroxy functional group, inorganic alkali salts, and combinations thereof, the neutralizing agent being present in the pigment composition in an amount in the range of from about 0.05% by weight to about 1.0% by weight based on the combined weight of the titanium dioxide particles and the dispersant package;

at least one dispersant component selected from the group of low molecular weight monomeric dispersants, polymeric dispersants and combinations thereof, the dispersant component being present in the pigment composition in an amount in the range of from about 0.05% by weight to about 1.0% by weight based on the combined weight of the titanium dioxide particles and the dispersant package; and at least one polyhydric alcohol component, the polyhydric alcohol component being present in the pigment composition in an amount in the range of from about 0.05% by weight to about 1.0% by weight based on the combined weight of the titanium dioxide particles and the dispersant package.

For example, the titanium dioxide pigment composition disclosed herein can be considered a "stir-in" titanium dioxide pigment composition in that it can be easily mixed into an aqueous solution to form a slurry for use in a waterborne latex paint formulation or directly into a waterborne latex paint formulation. For example, the titanium dioxide pigment composition disclosed herein can be mixed into an aqueous solution to form a slurry for use in a waterborne latex paint formulation or directly into a waterborne latex paint formulation without first grinding the pigment using high speed grinding equipment. An example of a high speed grinder that is commonly used to grind a titanium dioxide pigment in a paint manufacturing process is a Dispermat® high speed disperser manufactured by VMA-Getzmann GmbH. Such a disperser can be used with Cowles blades.

The titanium dioxide pigment composition slurry for use in a waterborne latex paint formulation disclosed herein comprises an aqueous medium, a plurality of titanium dioxide particles dispersed in the aqueous medium, and a dispersant package present in the aqueous medium in an amount of no greater than about 5% by weight based on the combined weight of the titanium dioxide particles and the dispersant package. For example, the aqueous medium is water. The titanium dioxide particles and the dispersant package are the titanium dioxide particles and dispersant package discussed above in connection with the titanium dioxide pigment composition disclosed herein.

As used herein and in the appended claims, a dispersant package "present in the aqueous medium" means that the components of the dispersant package are deposited on the surfaces of the titanium dioxide particles that are dispersed in the aqueous medium or otherwise present in the aqueous medium. For example, even though the dispersant package can initially be deposited on the surfaces of the titanium dioxide particles and added to the aqueous medium therewith, the polyhydric alcohol may become separated from the titanium dioxide particles once the pigment composition is added to the aqueous medium.

The titanium dioxide pigment composition slurry disclosed herein can be considered a "stir-in" titanium dioxide pigment composition slurry in that it can be easily mixed directly into a waterborne latex paint formulation. For example, the titanium dioxide pigment composition disclosed herein can be mixed directly into a waterborne latex paint formulation without first grinding the pigment slurry using high speed grinding equipment. As shown by the illustrative examples below, the slurry is stable for at least 7 months at 50° C., and the properties of latex paint made with the aged slurry are comparable with the control sample.

The method of forming a titanium dioxide pigment composition for use in a waterborne latex paint formulation disclosed herein comprises providing a plurality of titanium dioxide particles, providing a dispersant package, and depositing the dispersant package on the surfaces of the titanium dioxide particles in an amount of no greater than about 5% by weight based on the combined weight of the titanium dioxide particles and the dispersant package. The titanium dioxide particles and the dispersant package are the titanium dioxide particles and dispersant package discussed above in connection with the titanium dioxide pigment composition disclosed herein. The titanium dioxide pigment composition formed by the method is the same as the titanium dioxide pigment composition discussed above.

The method of forming a titanium dioxide pigment composition slurry for use in a waterborne latex paint formulation disclosed herein comprises providing an aqueous medium, providing a plurality of titanium dioxide particles, providing a dispersant package, depositing the dispersant package on the surfaces of the titanium dioxide particles in an amount of no greater than about 5% by weight based on the combined weight of the titanium dioxide particles and the dispersant package to form a titanium dioxide pigment composition, and dispersing the titanium dioxide pigment composition in the aqueous medium. For example, the aqueous medium is water. The titanium dioxide particles and the dispersant package are the titanium dioxide particles and dispersant package discussed above in connection with the titanium dioxide pigment composition disclosed herein. The titanium dioxide pigment composition formed by the method is the same as the titanium dioxide pigment composition discussed above.

For example, in one embodiment of both the method of forming a titanium dioxide pigment composition and the method of forming a titanium dioxide pigment composition slurry, the dispersant package is deposited on the titanium dioxide particles by carrying out the method in connection with a process for manufacturing the titanium dioxide particles. In these embodiments of the methods, the titanium dioxide particles that are provided are raw pigment particles, for example, produced by either the chloride process or the sulfate process. For example, the raw particles can be produced by the chloride process.

In these embodiments, the methods further comprise: prior to depositing the dispersant package on the surfaces of the raw titanium dioxide particles, grinding the raw titanium dioxide particles to a desired particle size and filtering and washing the ground titanium dioxide particles to form a wet pigment filter cake; wherein the dispersant package is deposited on the surfaces of the titanium dioxide particles by mixing the dispersant package with the wet pigment filter cake. The methods can further comprise: drying the wet pigment filter cake to form a dry pigment filter cake, crushing the dry pigment filter cake to form a crushed pigment filter cake, and steam micronizing the crushed pigment filter cake to form the titanium dioxide pigment composition.

In the method for forming a titanium dioxide pigment composition slurry, the steps of drying the wet pigment filter cake for form a dry pigment filter cake, crushing the dry pigment filter cake to form a crushed pigment filter cake, and steam micronized the crushed pigment filter cake to form the titanium dioxide pigment composition are carried out prior to dispersing the titanium dioxide pigment composition in the aqueous medium.

For example, in these embodiments, the methods can also comprise prior to grinding the raw titanium dioxide particles to a desired particle size, coating the titanium dioxide particles with at least one inorganic coating. For example, the inorganic coating(s) can be the same as the organic coating(s) discussed above in connection with the titanium dioxide pigment composition disclosed herein.

For example, in these embodiments, the wet pigment filter cake can be dried to form a dry pigment filter cake by various drying methods, including oven dry, spray dry, and spin flash dry methods.

For example, in these embodiments, the crushed dried pigment filter cake can be steam micronized to form the titanium dioxide pigment composition by utilizing a steam to a pigment weight ratio of 1:2.5 with a steam injector pressure set at 160 psi and micronizer ring pressure set at 118 psi.

Many advantages are achieved by the titanium dioxide pigment composition, titanium dioxide pigment composition slurry, method of forming a titanium dioxide pigment composition, and method of forming a titanium dioxide pigment composition slurry for use in a waterborne latex paint formulation disclosed herein. For example, as referenced above, the titanium dioxide pigment composition disclosed herein can be mixed into an aqueous solution to form a slurry for use in a waterborne latex paint formulation or directly into a waterborne latex paint formulation without first grinding the pigment using high speed grinding equipment. Similarly, the titanium dioxide pigment composition slurry disclosed herein can be mixed directly into a waterborne latex paint formulation without first grinding the pigment using high speed grinding equipment.

As a result, much less energy is required to mix the titanium dioxide pigment composition into a waterborne paint formulation than is required in connection with mixing other titanium dioxide pigment compositions into waterborne latex paint formulations. This results in significant cost savings. As shown below, the titanium dioxide pigment composition, slurry and methods disclosed herein can save nearly 90% of power consumption compared to conventional grinding equipment.

| #4 Energy Con for standard batch make up/shift | | | | |
|---|---|---|---|---|
| | Rpm | Watts @ maximum HP | kWh | at Mississippi price/kWh (10.3¢) |
| 50 min chemical add | 846 | 149200 | 124.3333 | $ 12.80633 |
| 200 min pigment add | 846 | 149200 | 497.4 | $ 51.2322 |
| 100 min mix time | 846 | 149200 | 248.667 | $ 25.61267 |
| 50 min let down | 846 | 149200 | 124.3333 | $ 12.80633 |
| Total per shift | | | | $ 102.4575 |
| Total per day | | | | $ 204.9151 |
| Total for 250 days of slurry production per year per disperser motor | | | | $ 51228.77 |
| Total for 250 days of slurry production per year | | | | $102457.5 101500 MT/ year $1.01/MT |
| 50 min chemical add | 65 | 11936 | 9.946667 | $ 1.024507 |
| 200 min pigment add | 65 | 11936 | 39.78667 | $ 4.098027 |
| 100 min mix time | 65 | 11936 | 19.8933 | $ 2.049013 |
| 50 min let down | 65 | 11936 | 9.94667 | $ 1.024507 |
| Total per shift | | | | $ 8.196053 |
| Total per day | | | | $ 16.39211 |
| Total for 250 days of slurry production per year per disperser motor | | | | $ 4098.027 |
| Total for 250 days of slurry production per year | | | | $ 8196.053 101500 MT/ year $0.08/MT |

*Propeller blade at 65 rpm is only 8% of 846 rpms at 11936 Watts.

The titanium dioxide pigment slurry can be introduced to water or a latex paint formulation with just stirring, for example, using a simple propeller blade, as opposed to energy intensive grinding equipment. The properties of pigment and the properties of the latex paint formulation are not impacted. If a batch turns out to be off-spec and more titanium dioxide pigment is required, the additional titanium dioxide pigment can merely be introduced to water or the latex paint formulation with just stirring. A labor intensive and costly grinding process does not need to be involved.

The dispersant package of the titanium dioxide pigment composition constitutes a minor part of the pigment composition. This allows the pigment composition to be used in latex paint manufacturing without introducing a relatively large amount of undesirable chemicals to the paint. The fact that the titanium dioxide pigment composition can be formed during the pigment manufacturing process saves costs and achieves other advantages.

The following examples illustrate specific embodiments consistent with the present disclosure but do not limit the scope of the disclosure or the appended claims. Concentrations and percentages are by weight unless otherwise indicated.

ILLUSTRATIVE EXAMPLES

Example 1—Stir-In Property Test

A quick check of the stir-in property of the titanium dioxide pigment composition disclosed herein was carried out by pouring in 120.0 g of the pigment composition into 37.0 g of deionized water in a plastic cup, and then hand mixing the components in the cup with a tongue depressor. A 76.5% solid slurry was obtained.

Example 2—Preparation of Silica and Alumina Treated Titanium Dioxide Filter Cake Particulate titanium dioxide pigment formed by the chloride process and containing 1.0% alumina in its crystalline lattice was dispersed in water in the presence of 0.075% of sodium hexametaphosphate dispersant, along with a sufficient amount of sodium hydroxide to adjust the pH of the dispersion to 9.5 or higher to achieve an aqueous dispersion with a solids content of 35%. The resulted slurry was subjected to sanding milling (using a zircon sand-to-pigment weight ratio of 4:1) until 94% of the particles had a particle size smaller than 0.63 microns, as determined by Microtrac X 100 Particle Size Analyzer.

The resulting slurry, diluted to a 30% solids content, was heated to 75° C. and subsequently treated with 3.0% of sodium silicate (calculated as silica by weight of final pigment), which was added over 20 minutes. While maintaining the temperature at 75° C., the pH of the slurry was slowly decreased to pH 5.5 over a 55 minute period via the slow addition of concentrated sulfuric acid. After allowing the slurry to digest for 15 minutes, 1.6% of sodium aluminate (calculated as alumina by weight of the final pigment), was added over 10 minutes. The pH of the slurry was maintained between 8.25-9.25 via the concomitant addition of concentrated sulfuric acid. The slurry was digested for 15 minutes at 75° C. The pH of the slurry was then adjusted to 6.2 with concentrated sulfuric acid. The slurry was filtered while hot. The resulting filtrate was washed with water, which had been preheated to 60° C. A wet titanium dioxide filter cake which had silica/alumina treatment was obtained.

Example 3—Standard Pigment Preparation

The wet titanium dioxide filter cake from Example 2 (which equates to 1000 g dry pigment) was mixed with deionized water to get a 50% slurry. Next, 10.61 g of a 33% trimethylolpropane (TMP) aqueous solution was added and thoroughly mixed into the slurry. The TMP treated titanium dioxide slurry was then dried in oven at 115° C. to a moisture content of less than 1%. The dried pigment was crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test, as described in Example 1. It only formed a paste. A slurry could not be obtained at a standard solids of 76%.

Next, the wet titanium dioxide filter cake from Example 2 was mixed with deionized water to get a 50% slurry. A TMP aqueous solution was added and thoroughly mixed into the slurry in an amount of 0.35% by weight TiO2. The IMP slurry was divided in to various parts, each part containing 1000 g of titanium dioxide. Each part was then treated with various well know dispersants for example (i) Tamol 1124, (ii) Tamol 1254. (iii) Zephram PD7000, (iv) Zephram 3300B, (v) Supersperse 95, (vi) Nuosperse 2000, (vii) Borchi Gen 451, (viii) Borchi Gen 755, and (ix) phosphonobutane tricarboxylic acid sodium salt. All these samples were dried in oven at 115° C. to a moisture content of less than 1%. The dried pigment was then crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test as described in Example 1. All these samples formed slurries having a low solids content (<60%) but formed only a paste at a higher solids content. A slurry could not be obtained at a standard solids of 76% except in connection with the sample with phosphonobutane tricarboxylic acid salt. In this sample, we were able to form the slurry but the grit content was high.

Example 4—Stir-In Pigment Preparation with 2-amino-2-methyl-1,3-propanediol

The wet titanium dioxide filter cake from Example 2 (which equates to 1000 g dry pigment) was weighted in a stainless steel pot. A chemical mixture was prepared with 10.61 g of a 33% TMP aqueous solution, 2.0 g of glycerol, 3.0 g of 2-amino-2-methyl-1,3-propanediol, 1.75 g of a 40% 2-phosphonobutane-1,2,4-tricarboxylic acid tetra sodium salt aqueous solution, and 1.48 g of Pat-Add 603 (a polymeric dispersant form Patcham Ltd.). The chemical mixture was mixed with the filter cake in the pot. Upon mixing, the filter cake could be fluidized to form a slurry without extra water. The treated titanium dioxide slurry was then dried in oven at 115° C. to a moisture content of less than 1%. The dried pigment was crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test as described in Example 1. It formed a liquid slurry at a 77% solids content with low grit.

Example 5—Stir-In Pigment Preparation with tris(hydroxymethyl)aminomethane

The wet titanium dioxide filter cake from Example 2, which equates to 1000 g dry pigment, was weighted in a stainless steel pot. A chemical mixture was prepared with 10.61 g of a 33% trimethylolpropane aqueous solution, 2.88 g of glycerol, 3.0 g of tris(hydroxymethyl)-aminomethane, 1.75 g of a 40% 2-phosphonobutane-1,2,4-tricarboxylic acid tetra sodium salt aqueous solution, and 1.48 g of Pat-Add 603 (a polymeric dispersant form Patcham Ltd.). The chemical mixture was mixed with the filter cake in the pot. Upon mixing, the filter cake could be fluidized to form a slurry without extra water. The treated titanium dioxide slurry was then dried in oven at 115° C. to a moisture content of less than 1%. The dried pigment was crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test, as described in Example 1. It formed a liquid slurry at 77% solids with low grit.

Example 6—Stir-In Pigment Preparation with Genamin Gluco 50

The wet titanium dioxide filter cake from Example 2, which equates to 1000 g dry pigment was weighted in a stainless steel pot. A chemical mixture was prepared with 10.61 g of a 33% trimethylolpropane aqueous solution, 2.08 g of glycerol, 10.0 g of Genamin Gluco 50, 1.75 g of a 40% 2-phosphonobutane-1,2,4-tricarboxylic acid tetrasodium salt aqueous solution, and 1.48 g of Pat-Add 603 (a polymeric dispersant form Patcham Ltd.). The chemical mixture was mixed with the filter cake in the pot. Upon mixing, the filter cake could be fluidized to form a slurry without extra water. The treated titanium dioxide slurry was then dried in oven at 115° C. to a moisture content of less than 1%. The dry pigment was then crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test, as described in Example 1. It formed a liquid slurry at 77% solids with low grit.

Example 7—Stir-In Pigment Preparation with Sodium Carbonate

The wet titanium dioxide filter cake from Example 2, which equates to 1000 g dry pigment, was weighted in a stainless steel pot. A chemical mixture was prepared with 10.61 g of a 33% trimethylolpropane aqueous solution, 2.0 g of glycerol, 2.0 g of sodium carbonate, 1.75 g of a 40% 2-phosphonobutane-1,2,4-tricarboxylic acid tetra sodium salt aqueous solution, and 1.48 g of Pat-Add 603 (a polymeric dispersant form Patcham Ltd.). The chemical mixture was mixed with the filter cake in the pot. Upon mixing, the filter cake could be fluidized to form a slurry without adding extra water. The treated titanium dioxide slurry was then dried in oven at 115° C. to a moisture content of less than 1%. The dried pigment was crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment was subjected to a stir-in property test, as described in Example 1. It formed liquid slurry at 77% solids with low grit.

Example 8—Properties of Stir-In Slurries

8a. Standard Pigment Grinding Slurry Preparation

The standard pigment of Example 3 was wetted in deionized water with a hydrophilic acrylic acid based dispersant and a hydroxyl amine based co-dispersant, and then high speed ground with a Cowles blade for 10 minutes. Slurry properties are presented in Table 1.

8b. Stir-In Pigment Stir-In Slurry Preparation

The stir-in pigments of Examples 4-7 were added to deionized water and stirred with a propeller blade. Slurry properties are presented in Table 1.

8c. Preparation of Slurries with Individual Ingredients of Dispersant Package Chemicals (not within the Scope of the Titanium Dioxide Pigment Composition Disclosed and Claimed Herein)

The stir-in nature of the titanium dioxide pigment composition disclosed herein comes from the combination of all three of the components of the dispersant package, the neutralizing agent, the dispersant component and the polyhydric alcohol component. None of these components are individually effective. To confirm this, the following experiments were conducted.

The wet titanium dioxide filter cake from Example 2 was taken and divided into two equal parts, each containing 1000 g dry pigment. Each part was weighted in a stainless steel pot, namely: (i) to the first pot, a chemical mixture of 10.61 g of a 33% trimethylolpropane aqueous solution and 1.48 g of Pat-Add 603 (a polymeric dispersant form Patcham Ltd.) was added; and (ii) to the second pot a chemical mixture of 10.61 g of a 33% trimethylolpropane aqueous solution and 3.0 g of 2-amino-2-methyl-1,3-propanediol was added. The chemical mixture was mixed with the filter cake in the pots. The treated titanium dioxide filter cake was then dried in oven at 115° C. to a moisture content of less than 1%. The dried pigment was crushed to yield a dry pigment powder. The dry pigment powder was then steam micronized utilizing a steam to pigment weight ratio of 1:2.5 with a steam injector pressure set at 160 psi and micronizer ring pressure set at 118 psi. The resulting pigment samples were subjected to a stir-in property test as described in Example 1, and the results are presented in Table 1. Other single chemicals, Tamol 1124 (hydrophilic acrylic acid copolymer ammonium salt), Pat-Add 603 (polymeric dispersant), and Cublen 8514 GR (1-hydroxyethylidenediphosphonic acid, sodium salt form), were also used separately with TMP to make the stir-in pigment and tested for the stir-in properties. The results are presented in Table 1.

TABLE 1

Properties of stir-in pigment slurries made with various packages.

| Chemical Treatment | 826 Control TMP | Stir-in (Single chemical) TMP, 0.25% Tamol 1124 | Stir-in (Single chemical) TMP, 0.10% Pat-add 603 | Stir-in (Single chemical) TMP, 0.30% AMPD | Stir-in (Single chemical) TMP, 1.0% Cublen 8514 GR | Stir-in pigment Example 3 | Stir-in pigment Example 4 | Stir-in pigment Example 5 | Stir-in pigment Example 6 |
|---|---|---|---|---|---|---|---|---|---|
| Grinding/stir in | grinding | stir-in | stir-in | stir-in | stir-in | stir-in | stir-in | stir-in | stir-in |
| Dispersants | Dispersant + Amine | None | None | None | None | None | None | None | None |
| pH | 8.59 | Not Able To Make | Not Able To Make | Not Able To Make | 76% solid slurry with viscosity >1000 cp, and the slurry gelled within one hour | 7.78 | 7.84 | 8.26 | 8.22 |
| % solid | 76.59 | Slurry >60% solids | Slurry >64% solids | Slurry >66% solids | | 76.37 | 76.68 | 77.00 | 76.82 |
| Viscosity (cp) | 501 | | | | | 635 | 388 | 346 | 205 |
| Grit (ppm) | 5 | | | | | 40 | 97 | 17 | 94 |

Testing of Stir-In Pigments in Paints

Testing Example 2: Standard and Stir-In Pigments Test in Gloss Acrylic Paint Formulation In each test, a sample and a standard were prepared in identical formulations as shown in the table. The actual amount of the slurry used was adjusted based on the percent solids. Water was also adjusted. Both paints were then drawn down side by side on a Leneta card. The gloss of the dried films was measured from reflected light at a sixty degree angle using a gloss meter. The CIE L* and b* values of the dried paint were measured using an integrating sphere spectrophotometer and these values were used to calculate the tint strength and tint tone.

| Material | Weight (g) |
| --- | --- |
| Rhoplex AC-2508 (46.5%) | 612.5 |
| TiO2 Slurry (76.5%) | 390.5 |
| Defoamer | 2.7 |
| Dispersant | 12 |
| Nonionic surfactant | 6.3 |
| Cellulosic thickener | 1.0 |
| Propylene glycol | 30 |
| Coalescent | 28.2 |
| Ammonium hydroxide | 1.5 |
| Biocide | 0.5 |
| DI water | 93 |

Tinted with 8 g of Colortrend 888 carbon black.

Tint strength was calculated using the Kubelka Munk Equation where:

$$\text{Tint Strength} = \left( \frac{\left(\frac{K}{S}\right) \text{Standard}}{\left(\frac{K}{S}\right) \text{Sample}} \right) (\text{Assigned Value})$$

where: K=Absorbance of carbon black pigment
S=Scatter of titanium dioxide pigment
Tint Tone was calculated as follows:

$$\text{Tint Tone} = b_{sample}^* - b_{standard}^* + \text{Assigned Value}$$

TABLE 2

Paint properties made with stir-in pigments

| | Standard pigment grinding slurry | Stir-in example with 1.0% Cublen 8514 GR | Stir-in Example 3 | Stir-in Example 4 | Stir-in Example 5 | Stir-in Example 6 |
| --- | --- | --- | --- | --- | --- | --- |
| Tint Strength | 106.1 | 109.4 | 108.8 | 110.3 | 109.4 | 109.5 |
| Tint Tone | −4.73 | −4.64 | −4.73 | −4.69 | −4.7 | −4.73 |
| Gloss | 61.3 | 49.1 | 65.8 | 61 | 64.5 | 63 |

The above data indicates that stir-in pigments do not have any adverse impacts on the pigment properties. Only improvements in optical properties were observed.

Testing Example 2: Paint Tint Strength Adjustment with Stir-In Pigment

During paint manufacturing, low tint strength (TS) is one of the major factors causing the batch to be off specifications. Titanium dioxide pigment has to be post added to boost up the tint strength. However, traditional titanium dioxide pigment has to be ground to make the pigment dispersion before the post-addition. This example will demonstrate the advantage of the titanium dioxide pigment composition disclosed herein in the application for TS adjustment.

Control 1 was a 100 gallon high gloss latex paint formulation. Control 2 was the same as control 1 except that it had 3 gallons of excess water based on 100 gallons of the control 1 formulation to simulate the paint TS off specification caused by excess water. The pigment composition disclosed herein in dry form was hand-mixed to form a slurry which ws then directly added into the Control 2 paint to increase the TS. The weight of post-added titanium dioxide pigment was 7% based on the total weight of the titanium dioxide in the formula. When hand mixing the stir-in slurry, the dry pigment composition was stirred into water with a tongue depressor by hand to achieve a 72% solid content. The results are shown in the table below. The data indicates that the post-addition of the titanium dioxide pigment composition disclosed herein could easily adjust the tint strength without an adverse impact on paint optical properties. With the pigment composition disclosed herein, the grind process of the titanium dioxide pigment was avoided in making the TS adjustment.

Control 1: 100 gallon acrylic gloss paint formulation.

| Millbase | Pounds |
| --- | --- |
| Water | 29.2 |
| Propylene Glycol | 7.0 |
| Dispersant | 4.9 |
| Coalescent | 7.8 |
| Surfactant | 2.2 |
| Biocide | 1.5 |
| Let Down | |
| Acrylic latex | 555.6 |
| TiO2 Slurry (76.5%) | 267.3 |
| Opacifying polymer dispersion | 37.4 |
| Defoamer | 2.0 |
| Ammonia (28%) | 2.0 |
| Water | 50.0 |
| Associative thickener 1 | 27.4 |
| Associative thickener 2 | 2.7 |
| Water | 21.9 |
| Total weight | 1018.9 |
| Total volume | 100 gallon |

Control 2: same as Control 1 except it had 3 gallons of excess water in the 100 gallon formulation of Control 1 to simulate paint TS off by excess water.

| Millbase | Pounds |
| --- | --- |
| Water | 29.2 |
| Propylene Glycol | 7.0 |
| Dispersant | 4.9 |
| Coalescent | 7.8 |
| Surfactant | 2.2 |
| Biocide | 1.5 |
| Let Down | |
| Acrylic latex | 555.6 |
| TiO2 Slurry (76.5%) | 267.3 |
| Opacifying polymer dispersion | 37.4 |
| Defoamer | 2.0 |
| Ammonia (28%) | 2.0 |
| Water | 50.0 |

-continued

| Millbase | Pounds |
|---|---|
| Associative thickener 1 | 27.4 |
| Associative thickener 2 | 2.7 |
| Water | 46.9 |
| Total weight | 1043.9 |
| Total volume | 103 gallon |

TS adjustment of control 2 by either post-addition of hand mixing stir-in slurry or direct post-addition of dry pigment composition into paint.

TABLE 3

Paint properties using stir-in pigment illustrating tint strength adjustment by post addition of Stir-in Pigment

| Sample ID description | Control formula 1 Standard control | Control formula 2 - with excess water Standard control with 3% excess of water (volume) based on total paint volume | Control formula 2 TS adjustment with hand mixing stir-in slurry * 7% post addition of TiO2 (net weight on total TiO2 net weight in formula) | Control formula 2 TS adjustment with dry addition of stir-in pigment 7% post addition of TiO2 (net weight on total TIO2 net weight in formula) |
|---|---|---|---|---|
| Opacity (2 mil), % | 95.96 | 95.69 | 96.00 | 96.18 |
| Paint surface | Smooth | Smooth | Smooth | Smooth |
| Tint Strength, % | 100 | 98.1 | 100.3 | 100.8 |
| Gloss @ 60°, tinted | 68.5 | 68.9 | 67.2 | 67.3 |
| Color Acceptance | pass | pass | pass | pass |

* Hand mixing slurry was made by hand mixing stir-in TiO2 pigment into water with a tongue depressor.

Therefore, the pigments, compositions and methods are well adapted to attain the ends and advantages mentioned, as well as those that are inherent therein. The particular examples disclosed above are illustrative only, as the present pigments, compositions and methods may be modified and practiced in different but equivalent manners apparent to those skilled in the art having the benefit of the teachings herein. It is therefore evident that the particular illustrative examples disclosed above may be altered or modified, and all such variations are considered within the scope and spirit of the present pigments, compositions and methods. While the pigments, compositions and methods are described in terms of "comprising," "containing," "having," or "including" various components or steps, the pigments, compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A stir-in titanium dioxide pigment composition for use in a waterborne latex paint formulation, comprising:
   a plurality of titanium dioxide particles; and
   a dispersant package deposited on the surfaces of said titanium dioxide particles in an amount of no greater than about 5% by weight based on the combined weight of said titanium dioxide particles and said dispersant package, said dispersant package including:
   at least one non-volatile neutralizing agent selected from the group consisting of organic compounds having at least one amine functional group and at least one hydroxy functional group, inorganic alkali salts, and combinations thereof;
   at least one dispersant component selected from the group consisting of low molecular weight monomeric dispersants, polymeric dispersants, and combinations thereof; and
   at least one polyhydric alcohol component, wherein said titanium dioxide pigment composition is in dry form.

2. The titanium dioxide pigment composition of claim 1, wherein said titanium dioxide particles are formed by the chloride process.

3. The titanium dioxide pigment composition of claim 1, wherein said titanium dioxide particles have at least one inorganic coating deposited on the surfaces thereof, wherein said inorganic coating(s) is selected from the group consisting of metal oxide coatings, metal hydroxide coatings, and combinations thereof.

4. The titanium dioxide pigment composition of claim 3, wherein said inorganic coating(s) are selected from the group consisting of silica coatings, alumina coatings, zirconium coatings, and combinations thereof.

5. The titanium dioxide pigment composition of claim 1, wherein said dispersant package is present in said pigment composition in an amount of no greater than about 2% by weight based on the combined weight of said titanium dioxide particles and said dispersant package.

6. The titanium dioxide pigment composition of claim 1, wherein said organic compounds having at least one amine functional group and at least one hydroxy functional group are selected from the group consisting of alkyl amine hydroxyls, aromatic amine hydroxyls, and combinations thereof.

7. The titanium dioxide pigment composition of claim 6, wherein said organic compounds having at least one amine functional group and at least one hydroxy functional group are selected from the group consisting of 2-amino-2-methyl-1,3-propanediol, 2-amino-2-ethyl-1,3-propanediol, tris(hydroxymethyl)aminomethane, triethanolamine, N-butyl-diethanolamine, dimethylglucamine, and combinations thereof.

8. The titanium dioxide pigment composition of claim 1, wherein said inorganic alkali salts are selected from the group consisting of alkali metal carbonates, alkali metal bicarbonates, and combinations thereof.

9. The titanium dioxide pigment composition of claim 1, wherein said low molecular weight monomeric dispersants are selected from the group consisting of phosphates, carboxylic acids, di or tri carboxylic acids, phosphonates, phosphonate based carboxylic acids, and combinations thereof.

10. The titanium dioxide pigment composition of claim 9, wherein said low molecular weight monomeric dispersants are selected from the group consisting of sodium hexametaphosphate, phosphate carboxylic acids, salts of phosphate carboxylic acids, hydroxyl carboxylic acids, salts of hydroxyl carboxylic acids, and combinations thereof.

11. The titanium dioxide pigment composition of claim 1, wherein said polymeric dispersants are polymeric molecules that contain one or more functional groups of compounds selected from the group consisting of amines, carboxylic acids, sulfonic acids, phosphonic acids, and phosphoric acids; salts of amines, carboxylic acids, sulfonic acids, phosphonic acids, and phosphoric acids; and combinations thereof.

12. The titanium dioxide pigment composition of claim 11, wherein said polymeric dispersants are selected from the group consisting of polyacrylic acid, polyacrylic acid copolymers, salts of polyacrylic acid and polyacrylic acid copolymers, maleic acid copolymers, salts of maleic acid copolymers, and combinations thereof.

13. The titanium dioxide pigment composition of claim 1, wherein said polyhydric alcohol components are selected from the group consisting of alkyl straight chain polyols, alkyl branched chain polyols, and combinations thereof.

14. The titanium dioxide pigment composition of claim 13, wherein said polyhydric alcohol components are selected from the group consisting of trimethylolpropane, ditrimethylolpropane, glycerol, diglycerol, pentaerythritol, mannitol, and combinations thereof.

15. A method of forming a stir-in titanium dioxide pigment composition in dry form for use in a waterborne latex paint formulation, comprising:
    providing a plurality of titanium dioxide particles;
    providing a dispersant package, said dispersant package including:
        at least one non-volatile neutralizing agent selected from the group consisting of organic compounds having at least one amine functional group and at least one hydroxy functional group, inorganic alkali salts, and combinations thereof;
        at least one dispersant component selected from the group consisting of low molecular weight monomeric dispersants, polymeric dispersants, and combinations thereof; and
        at least one polyhydric alcohol component;
    depositing said dispersant package on the surfaces of said titanium dioxide particles in an amount of no greater than about 5% by weight based on the combined weight of said titanium dioxide particles and said dispersant package; and
    after depositing said dispersant package on the surfaces of said titanium dioxide particles, drying said titanium dioxide particles to form a stir-in titanium dioxide pigment composition in dry form.

16. The method of claim 15, wherein said titanium dioxide particles are raw titanium dioxide particles, and said method further comprises:
    prior to depositing said dispersant package on said surfaces of said raw titanium dioxide particles, grinding said titanium dioxide particles to a desired particle size and filtering and washing said ground titanium dioxide particles to form a wet pigment filter cake;
    wherein said dispersant package is deposited on said surfaces of said titanium dioxide particles by mixing said dispersant package with said wet pigment filter cake.

17. The method of claim 16, further comprising:
    drying said wet pigment filter cake to form a dried pigment filter cake;
    crushing said dried pigment filter cake to form a crushed pigment filter cake; and
    steam micronizing said crushed filter cake to form said titanium dioxide pigment composition.

18. A method of forming a stir-in titanium dioxide pigment composition slurry for use in a waterborne latex paint formulation, comprising:
    providing an aqueous medium;
    providing a plurality of titanium dioxide particles;
    providing a dispersant package, said dispersant package including:
        at least one non-volatile neutralizing agent selected from the group consisting of organic compounds having at least one amine functional group and at least one hydroxy functional group, inorganic alkali salts, and combinations thereof;
        at least one dispersant component selected from the group consisting of low molecular weight monomeric dispersants, polymeric dispersants, and combinations thereof; and
        at least one polyhydric alcohol component; and
    depositing said dispersant package on the surfaces of said titanium dioxide particles in an amount of no greater than about 5% by weight based on the combined weight of said titanium dioxide particles and said dispersant package to form a titanium dioxide pigment composition; and
    dispersing said titanium dioxide pigment composition in said aqueous medium to form a stir-in titanium dioxide pigment composition slurry, wherein prior to being dispersed in said aqueous medium, said titanium dioxide pigment composition is in dry form.

19. The method of claim 18, wherein said titanium dioxide particles are raw titanium dioxide particles, and said method further comprises:
    prior to depositing said dispersant package on said surfaces of said raw titanium dioxide particles, grinding said titanium dioxide particles to a desired particle size and filtering and washing said ground titanium dioxide particles to form a wet pigment filter cake;
    wherein said dispersant package is deposited on said surfaces of said titanium dioxide particles by mixing said dispersant package with said wet pigment filter cake.

20. The method of claim 19, further comprising prior to dispersing said titanium dioxide pigment composition in said aqueous medium,
    drying said wet pigment filter cake to form a dried pigment filter cake;
    crushing said dried pigment filter cake to form a crushed pigment filter cake; and
    steam micronizing said crushed filter cake to form said titanium dioxide pigment composition.

21. The method of claim 18, wherein said titanium dioxide pigment composition slurry formed by the method is a stir-in titanium dioxide pigment composition slurry.

22. A stir-in titanium dioxide pigment composition for use in a waterborne latex paint formulation, comprising:
- a plurality of titanium dioxide particles, wherein said titanium dioxide particles are formed by the chloride process; and
- a dispersant package deposited on the surfaces of said titanium dioxide particles in an amount of no greater than about 5% by weight based on the combined weight of said titanium dioxide particles and said dispersant package, said dispersant package including:
  - at least one non-volatile neutralizing agent selected from the group consisting of organic compounds having at least one amine functional group and at least one hydroxy functional group, inorganic alkali salts, and combinations thereof;
  - at least one dispersant component selected from the group consisting of low molecular weight monomeric dispersants, polymeric dispersants, and combinations thereof; and
  - at least one polyhydric alcohol component, wherein said titanium dioxide pigment composition is in dry form.

23. A stir-in titanium dioxide pigment composition for use in a waterborne latex paint formulation, comprising:
- a plurality of titanium dioxide particles; and
- a dispersant package deposited on the surfaces of said titanium dioxide particles in an amount of no greater than about 5% by weight based on the combined weight of said titanium dioxide particles and said dispersant package, said dispersant package including:
  - at least one non-volatile neutralizing agent selected from the group consisting of organic compounds having at least one amine functional group and at least one hydroxy functional group, inorganic alkali salts, and combinations thereof, wherein said inorganic alkali salts are selected from the group consisting of alkali metal carbonates, alkali metal bicarbonates, and combinations thereof;
  - at least one dispersant component selected from the group consisting of low molecular weight monomeric dispersants, polymeric dispersants, and combinations thereof; and
  - at least one polyhydric alcohol component, wherein said titanium dioxide pigment composition is in dry form.

24. A stir-in titanium dioxide pigment composition for use in a waterborne latex paint formulation, comprising:
- a plurality of titanium dioxide particles; and
- a dispersant package deposited on the surfaces of said titanium dioxide particles in an amount of no greater than about 5% by weight based on the combined weight of said titanium dioxide particles and said dispersant package, said dispersant package including:
  - at least one non-volatile neutralizing agent selected from the group consisting of organic compounds having at least one amine functional group and at least one hydroxy functional group, inorganic alkali salts, and combinations thereof;
  - at least one dispersant component selected from the group consisting of low molecular weight monomeric dispersants, polymeric dispersants, and combinations thereof, wherein said polymeric dispersants are selected from the group consisting of polyacrylic acid, polyacrylic acid copolymers, salts of polyacrylic acid and polyacrylic acid copolymers, maleic acid copolymers, salts of maleic acid copolymers, and combinations thereof; and
  - at least one polyhydric alcohol component, wherein said titanium dioxide pigment composition is in dry form.

25. A method of forming a stir-in titanium dioxide pigment composition slurry for use in a waterborne latex paint formulation, comprising:
- providing an aqueous medium;
- providing a plurality of titanium dioxide particles, wherein said titanium dioxide particles are raw titanium dioxide particles;
- providing a dispersant package, said dispersant package including:
  - at least one non-volatile neutralizing agent selected from the group consisting of organic compounds having at least one amine functional group and at least one hydroxy functional group, inorganic alkali salts, and combinations thereof;
  - at least one dispersant component selected from the group consisting of low molecular weight monomeric dispersants, polymeric dispersants, and combinations thereof; and
  - at least one polyhydric alcohol component;
- grinding said titanium dioxide particles to a desired particle size and filtering and washing said ground titanium dioxide particles to form a wet pigment filter cake;
- depositing said dispersant package on the surfaces of said titanium dioxide particles by mixing the dispersant package with said wet pigment filter cake, wherein said dispersant package is deposited on the surfaces of said titanium dioxide particles in an amount of no greater than about 5% by weight based on the combined weight of said titanium dioxide particles and said dispersant package to form a titanium dioxide pigment composition; and
- dispersing said titanium dioxide pigment composition in said aqueous medium to form a stir-in titanium dioxide pigment composition slurry, wherein prior to being dispersed in said aqueous medium, said titanium dioxide pigment composition is in dry form.

26. The method of claim 25, further comprising prior to dispersing said titanium dioxide pigment composition in said aqueous medium,
- drying said wet pigment filter cake to form a dried pigment filter cake;
- crushing said dried pigment filter cake to form a crushed pigment filter cake; and
- steam micronizing said crushed filter cake to form said titanium dioxide pigment composition.

* * * * *

UNITED STATES PATENT AND TRADEMARK OFFICE
CERTIFICATE OF CORRECTION

| | |
|---|---|
| PATENT NO. | : 12,091,556 B2 |
| APPLICATION NO. | : 15/897126 |
| DATED | : September 17, 2024 |
| INVENTOR(S) | : Quan Su et al. |

Page 1 of 1

It is certified that error appears in the above-identified patent and that said Letters Patent is hereby corrected as shown below:

In the Specification

Column 6, Line 20: replace "." with --,--

Column 11, Line 60: replace "IMP" with --TMP--

Column 11, Line 64: replace "." with --,--

Column 13, Line 7: replace "2.08g" with --2.0g--

Columns 13 and 14, Table 1: replace "Example 3" with --Example 4--

Columns 13 and 14, Table 1: replace "Example 4" with --Example 5--

Columns 13 and 14, Table 1: replace "Example 5" with --Example 6--

Columns 13 and 14, Table 1: replace "Example 6" with --Example 7--

Column 16, Line 47, Control 1 Table: replace "gallon" with --gallons--

Column 17, Line 9, Control 2 Table: replace "gallon" with --gallons--

Signed and Sealed this
Sixth Day of May, 2025

Coke Morgan Stewart
*Acting Director of the United States Patent and Trademark Office*